(12) United States Patent
Sugawara et al.

(10) Patent No.: US 6,560,533 B2
(45) Date of Patent: *May 6, 2003

(54) VEHICLE NAVIGATION HAVING BRANCH ROAD GUIDANCE

(75) Inventors: Yoshihiko Sugawara, Obu; Wataru Sugiura, Anjo, both of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/832,854

(22) Filed: Apr. 12, 2001

(65) Prior Publication Data

US 2001/0041962 A1 Nov. 15, 2001

(30) Foreign Application Priority Data

May 10, 2000 (JP) ........................ 2000-137380

(51) Int. Cl.7 ............................................... G01C 21/00
(52) U.S. Cl. ........................ 701/211; 701/201; 340/990
(58) Field of Search ................................. 701/200, 201, 701/208, 211; 340/990, 995

(56) References Cited

U.S. PATENT DOCUMENTS

| 5,177,685 A | * | 1/1993 | Davis et al. ................. 364/443 |
| 5,414,629 A | | 5/1995 | Inoue ........................... 364/444 |
| 5,444,629 A | | 8/1995 | Kishi et al. .................. 364/449 |
| 6,226,590 B1 | * | 5/2001 | Fukaya et al. .............. 701/209 |

FOREIGN PATENT DOCUMENTS

| JP | A-50-48386 | 4/1975 |
| JP | A-4-278700 | 10/1992 |
| JP | A-8-313291 | 11/1996 |
| JP | A-10-122890 | 5/1998 |
| JP | A-10-300506 | 11/1998 |
| JP | A-2001-59733 | 3/2000 |

* cited by examiner

Primary Examiner—Yonel Beaulieu
(74) Attorney, Agent, or Firm—Posz & Bethards, PLC

(57) ABSTRACT

In a vehicle navigation system, a memory stores branch road numbers as a part of links which indicate branch roads branching out from a main road or a rotary road. The branch road numbers are specific to the branch roads, respectively, and may be exit numbers of an expressway or the rotary road. The branch road numbers are identical with actual indication provided on roadside signboards which indicates respective branch roads. A navigation control unit provides a branching guidance in the course of a normal travel route guidance when a vehicle approaches a branching point. The control unit checks whether a branch road number is available, and retrieves it when available. This retrieved number is provided as a voice message to a driver.

18 Claims, 5 Drawing Sheets

VEHICLE NAVIGATION HAVING BRANCH ROAD GUIDANCE

CROSS REFERENCE TO RELATED APPLICATION

This application is based on and incorporates herein by reference Japanese Patent Application No. 2000-137380 filed May 10, 2000.

BACKGROUND OF THE INVENTION

The present invention relates to a vehicle navigation having guide representation of branch roads, and particularly to a vehicle navigation which provides an appropriate guide representation concerning a junction having branch roads.

Various vehicle navigation systems are known as equipment for enabling a driver to arrive at the destination without difficulty. The navigation systems detect the present position of a vehicle by GPS (global positioning system) or the like as the vehicle travels, so that they represent the present position with a road map on a display. The navigation systems also provide a route guidance to the destination visually on the displayed road map and with voice message from a speaker.

Some navigation systems provide a branching guidance to guide an exit while traveling an expressway. For instance, the guidance is made by providing a voice message "Exit for XXX direction is about 700 meters ahead" when the vehicle approaches a position which is about 700 meters away from the branch road (exit). This conventional guidance provides only limited information such as names of directions which specify branch roads. Thus, it is difficult to match the guidance with guide signboard provided in correspondence with the branch road.

For instance, a driver may mishear or miss voice messages of the names of the directions when the guidance is provided with a voice message. The driver may also misread or miss the names of the directions written on the guidance signboard even if the driver catches the voice messages. Thus, the branch roads which the driver should take cannot be taken properly, if the driver fails to match the voice message guidance with the written information on the signboards.

Other navigation systems provide the branching guidance by the number of exits which the driver should pass on an expressway. For instance, the guidance provides a message "Take N-th exit." However, this system requires a driver to count the number of the exits. If the driver miscounts, the driver cannot take the right exit to the branch road which should be taken.

SUMMARY OF THE INVENTION

The present invention has therefore an object to provide an appropriate route guidance including a branching guidance.

According to the present invention, a navigation system provides a travel route guidance to a destination and a branching guidance for indicating a branch road to be taken from a presently traveling road in the course of the travel route guidance. A control unit checks whether a branch road number which is specific to the branch road to be taken is available in a road map data stored in a memory. The branch road number may be an exit number of an expressway or a rotary road, and identical with a number actually indicated on a roadside signboard which indicates the branch road. The control unit retrieves the branch road number from the memory if available in the memory, and indicates the retrieved exit number in a vehicle. The retrieved branch road number is preferably provided as a voice message.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT (First Embodiment)

Figure 1:
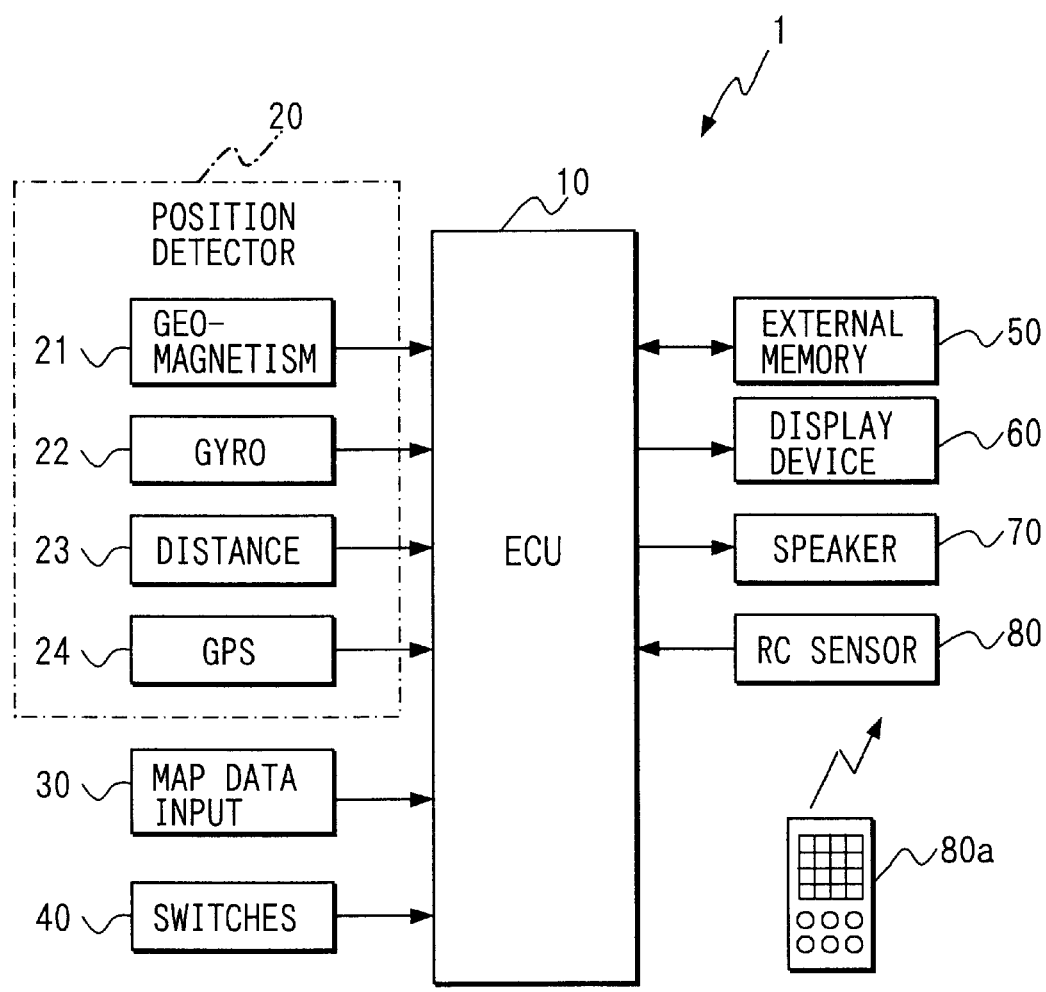
FIG. 1 is a block diagram showing a navigation system having a branching guidance according to a first embodiment of the present invention.

Referring to FIG. 1, a navigation system 1 mounted in a vehicle includes an electronic control unit 10. The control unit 10 is connected to a position detector 20, a map data input device 30, a group of operation switches 40, an external memory 50, and a remote-control sensor 80. The control unit 10 is further connected to a display device 60 and a speaker 70. The control unit 10 comprises a CPU, ROM, RAM, I/O and bus connecting these components.

The position detector 20 includes a geomagnetism sensor 21, a gyroscope 22, a distance sensor 23 and a GPS (global positioning system) receiver 24. The geomagnetism sensor 21 detects geomagnetism. The gyroscope 22 detects a magnitude of rotary motion applied to the vehicle. The distance sensor 23 comprises a speed sensor, wheel sensors and the like and detects a mileage of the vehicle. The GPS receiver 24 receives radio waves transmitted from a satellite for GPS via a GPS antenna. The position detector 20 thus detects the present position of the vehicle. Since these sensors have their own detection errors, they are configured to be used for complementing each other. The position detector 20 may comprise only a part of the above sensors depending on the required precision.

The map data input unit 30 is used for inputting various data including data for map matching for improving the precision of detection of the present position and road data which represents connections of roads from a storage memory. A CD-ROM or a DVD is usually employed as the storage memory in view of the amount of data. However, other media such as a memory card may be employed to store the data.

The format of the map data includes link information, node information and information of the connections between links. The link information includes information regarding a link itself, such as link ID that is a unique number for identifying each link, link class for identifying each link as a expressway, a toll road, an ordinary road or an access road, link length identifying the length of each link, link width identifying the width of each link, and coordinates (X, Y) of the starting point and coordinates of the end point of each link. With regard to the link which branches out from a main road or a rotary road (circle or runabout), the link information additionally has branch road information which identifies that the link is a branch road.

The branch road information comprises a branch road number and a branch road name. The branch road number is a number specifically allocated to each branch road, and comprises symbols such as numerals, alphabets or the like. The branch road name is a name of the branch road itself, a road connecting to the branch road or a name of direction in which the branch road is directed. All the branch roads do not always have the branch road number and the branch road name. Some branch road information may have only their branch road names or none of the branch road names nor branch road number.

These branch road numbers and the branch road names are the same as the information which are normally written on road side signboards. Thus, when the branch road number or the branch road name is provided on the display 60 or from the speaker 70, the driver can match the provided branch road information with other information provided on the signboard and specify the branch road with certainty.

The node information includes node ID that is a unique number for identifying each node to which a link is connected, data which represents No right/left turn or the presence of a signal at the crossing corresponding to the node and the like. The information of the connections between links includes, for example, data which represents that it is not passable from one link to another because the link is a one-way road. When the link is a one-way road, although it is passable from a link to the link, it is not passable from another link to the same link sometimes. Therefore whether it is passable or not is determined depending on the form of the connection between links.

As the group of operation switches 40, touch-switches integrated with and provided on the display device 60 or mechanical key-switches provided on the periphery of the display device 60 may be employed. The touch-switches are formed of infrared sensors arranged lengthwise and crosswise on the screen of the display device 60. When a driver blocks off the infrared light by his/her finger or a touch-pen, the position where the infrared light is blocked off is detected as values of two-dimensional coordinates (X, Y). Thus, the driver can input a specific instruction by directly touching the screen.

This group of operation switches 20 are various switches for operating the navigation system 1, and specifically a switch for switching the content displayed on the display device 60 and a switch for the driver's setting a route to the destination are included.

The external memory 50 is a hard disk device which stores various information in the course of executing route guidance process. This memory 50 may be a semiconductor memory. The display device 60 is a color display device. On the screen of the display device 60, the map data inputted from the map data input unit 30 is displayed, and mark indicating the present position of the vehicle which is detected by the position detector 20, a guide route provided on the map, and additional data such as names or marks are also displayed and superimposed on the map data. The speaker 70 gives a user voice information which is provided as a result of processes by the control unit 10 for various route guidance. The remote control sensor 80 receives instructions from a remote controller 80a which may be used in place of the operation switches 40.

This navigation system 1, particularly the control unit 10, has a route guidance function which receives the position of the destination and, if necessary, designation of a specific route (or a transit point) such as an expressway as inputs via the remote-control sensor 80 or the group of operation switches 40, and automatically selects and displays the optimal route from the present position to the destination as a route guidance. For example, Dijkstra's algorithm may be used for automatically establishing the optimal route in the known manner. While the vehicle travels along the guide route, the navigation system 1 displays an enlarged view of a crossing when the vehicle approaches the crossing concerning which guidance should be provided on ordinary roads and displays a diagram of a junction when the vehicle approaches the junction.

The control unit 10 is programmed to provide a branching guidance in the course of the above route guidance when a vehicle approaches a junction from which a branch road branches out. This branching guidance is executed as shown in FIG. 2 and FIG. 3, which show branch road processes in the case of traveling on an expressway and a rotary, respectively.

Figure 2:
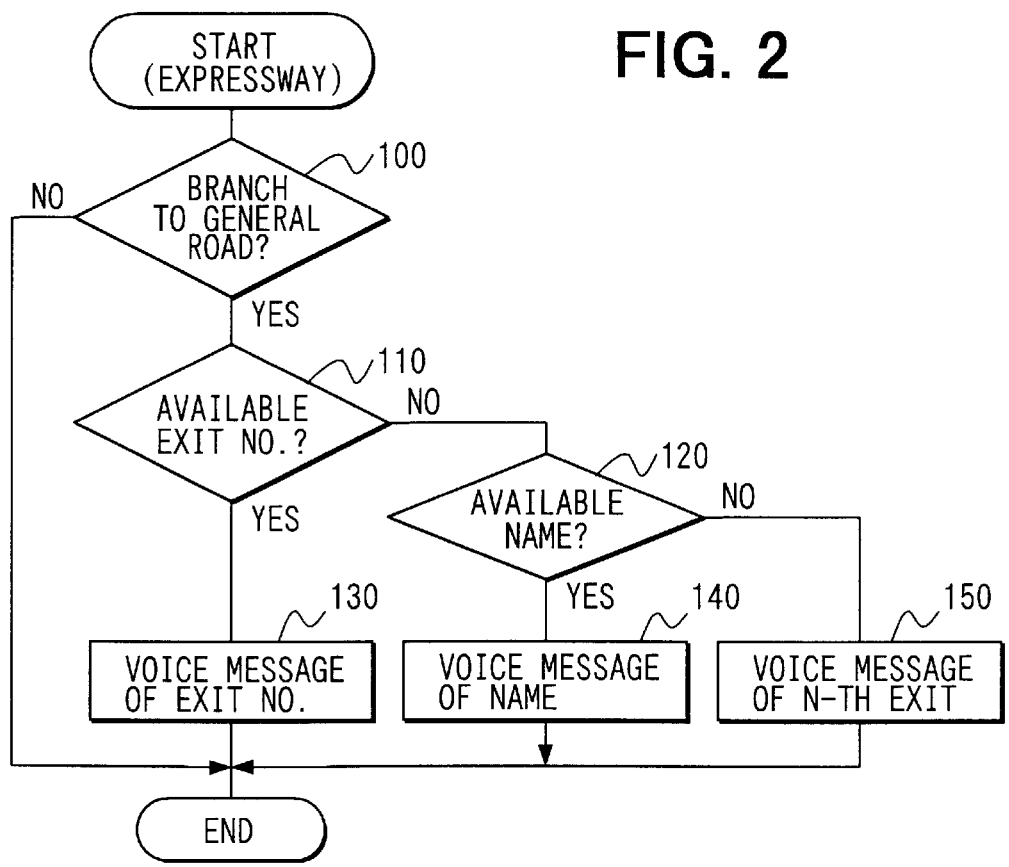
FIG. 2 is a flow diagram showing a branch guidance process performed by a control unit of the navigation system in the first embodiment in the case of traveling an expressway.
Figure 3:
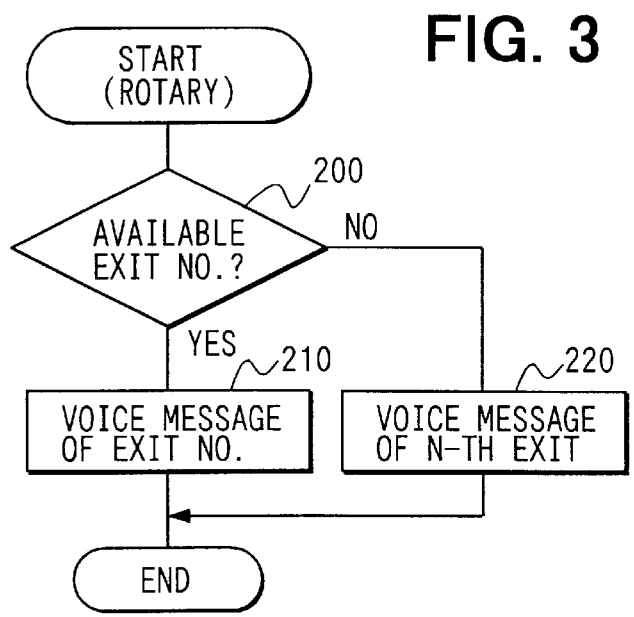
FIG. 3 is a flow diagram showing another branch guidance process performed by the control unit of the navigation system in the first embodiment in the case of traveling a rotary.

In FIG. 2, it is assumed that the vehicle is traveling on an expressway and the control unit 10 realizes in the course of a normal route guidance process (not shown) that a vehicle approaches a branch road. This process is executed every predetermined point which may be 700 meters, 300 meters and 100 meters away from the branch road.

This process first checks at step 100 whether the coming branch road is a general road. The process proceeds to step 110 if it is a general road (YES), but this process ends without a branching guidance if it is not a general road (NO). If the branch road is not a general road but an expressway, for instance, the branch road may be a junction which leads to another expressway. In this instance, no branching guidance is provided because the process of FIG. 2 is directed to the guidance from the expressway to the general road.

The process then checks at step 110 whether an exit number corresponding to the branch road number is available, by referring the link information of the map data. The process proceeds to steps 130 and 120, if the exit number is available (YES) and is not available (NO), respectively. With this YES determination, the process provides at step 130 a voice message which indicates the exit number.

If the determination at step 110 is NO, the process further checks at step 120 whether a name of the branch road or the direction corresponding to the exit is available, by referring to the link information of the map data. The process proceeds to steps 140 and 150, if the name is available (YES) and not available (NO), respectively. With this YES determination, the process provides a voice message of the available name at step 140. With the NO determination at step 120, however, the process provides a voice message of N-th exit at step 150 to inform the number of exits which a driver should pass through before reaching the exit where the driver should take.

Figure 4A:
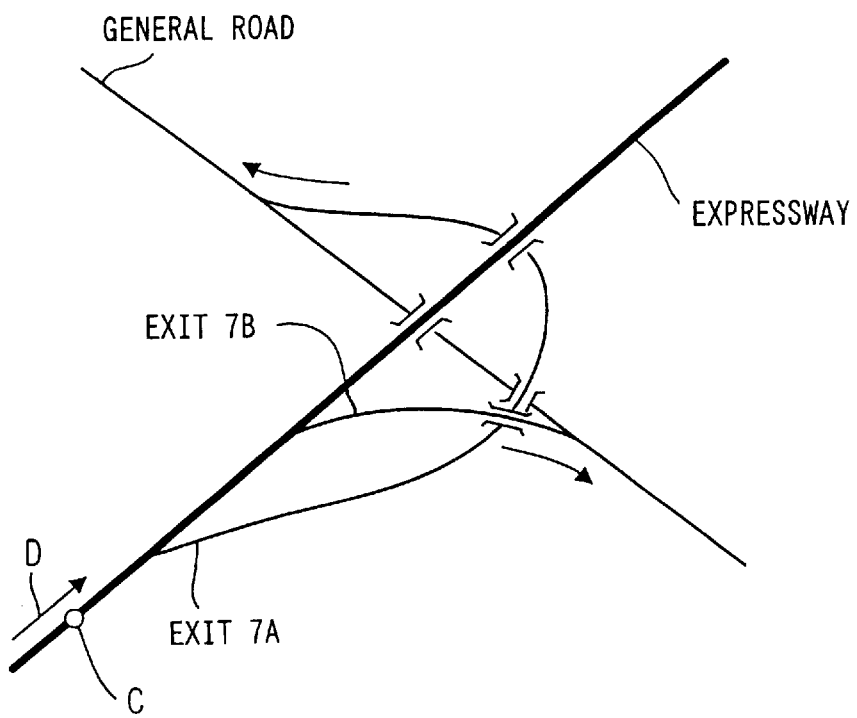
FIGS. 4A and 4B are schematic views showing operations of the first embodiment in the case of traveling the expressway and the rotary, respectively.

The navigation system 1 operates as shown in FIG. 4A by the execution of the branching guidance process of FIG. 2. In FIG. 4A, it is assumed that an expressway crosses over a general road which a driver should take branching from the expressway. The present position and the travel direction of a vehicle is indicated with PP and D, respectively.

In the case of guiding the vehicle from the expressway to the general road in the leftward direction as shown in FIG. 4A, the navigation system 1 determines that road to be taken is a general road (step 100). The navigation system 1 then provides a voice message from the speaker 70 indicating the exit number 7A (step 130), if the map data has the exit number 7A (step 110: YES). However, the navigation system 1 provides a voice message indicating a direction name or a road name, if the map data do not have the exit number (step 110: NO) but has the direction name or road name (step 120: YES). The navigation system 1 provides a voice message indicating the number of exits which should be passed through, if neither the exit number nor the name is available in the map data (step 120: NO). Since the exit is just ahead of the vehicle in this instance, the navigation system 1 provides a voice message such as "Take the next exit."

In the case of guiding the vehicle in the rightward direction as shown in FIG. 4A, the navigation system 1 provides a voice message in the similar manner. That is, it provides a voice message of either the exit number 7B (step 130), the name (step 120) or the number of exits to be passed through (step 150) based on the information of the map data. The navigation system 1, however, provides at step 150 the voice message such as "Take the second exit," because the exit 7B for the rightward direction follows the exit 7A.

If a branching guidance from one expressway to another through an expressway junction is desired, it may be executed in the similar manner in the navigation system 1. In this instance, step 100 is modified to check whether the branch road is an expressway and step 150 is modified to provide a voice message such as "Take the next exit." Further, a branching guidance between two general roads is desired, it may be executed in the similar manner by steps 100 through 140.

In FIG. 3, it is assumed that the control unit 10 realizes in the course of a normal route guidance process (not shown) that a vehicle approaches a rotary road. This process is executed at every predetermined point which may be predetermined distances away from the branch road.

This process first checks at step 200 whether an exit number is available. The exit number corresponds to the branch road number which should be taken from the rotary. Therefore, step 200 is executed by referring to the link information in the map data. The process proceeds to steps 210 and 220 if the exit number is available and not available, respectively. With the YES determination at step 200, the process provides a voice message indicating the exit number which the driver should take. With NO determination at step 200, on the other hand, the process provides a voice message indicating the number of exits which the driver should pass through from entering the rotary. Thus, the message may be "Take N-th exit."

Figure 4B:
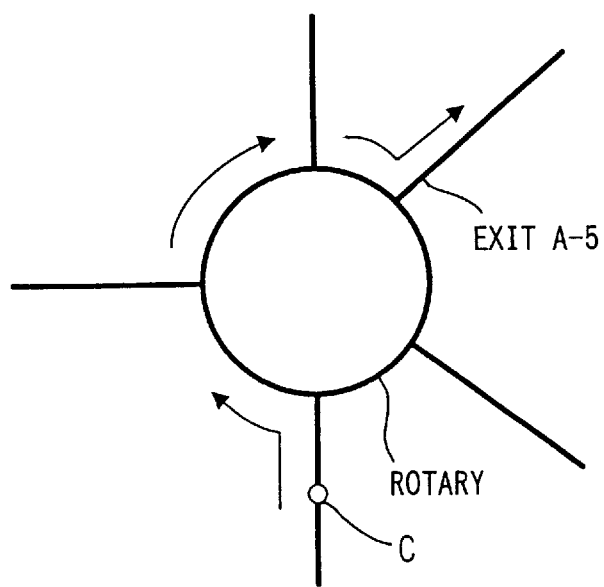

The navigation system 1 operates as shown in FIG. 4B by the execution of the branching guidance process of FIG. 3. In FIG. 4B, it is assumed that the rotary is connected to five roads and the route guidance indicates a recommended travel path to the third road from the present position C in the clockwise direction.

In the case of guiding the vehicle to the third road as shown in FIG. 4A, the navigation system 1 refers to the link information of the map data. If the link information includes the exit number A-5 (S200: YES), the navigation system 1 provides a voice message such as "Take exit A-5" (S210). If the link information does not include the exit number (S200: NO), the navigation system 1 provides a voice message such as "Take the third exit" (S220).

According to the first embodiment, a branch road number is provided in link information of such a branch road branching out from a main road (for instance, expressway) or a rotary road as a part of information for specifying the branch road. This branch road number is specific to the branch road number and may be numerals, alphabets or the combination thereof. The branch road number is the same one which is actually used to indicate the branch road on the signboard. This branch road number (exit number) is provided as a voice message in the branching guidance operation which is performed in the course of normal travel route guidance operation. Thus, a driver can easily match the branch road which should be taken with the notice of the branch road written on the signboard. Further, as the guidance is made not as a road name but as a road number in a voice message, a driver can easily understand the voiced information (exit number) and need not pay too much attention on the display.

In the first embodiment, the voice message of the exit number (branch road number) is preferably made in different languages (Japanese, English, French, German and the like). The voice message may be provided as a combination of the exit number and the road name or a combination of the exit number and the N-th exit. Further, the information provided by the voice message may be displayed on the display device 60. Although the driver will have to pay attention to the display screen, the required time to recognize the displayed exit number can be shorter than to recognize the road name which is longer than the number. When the exit number is displayed, the road name or the N-th exit may be displayed additionally.

(Second Embodiment)

In a second embodiment, the control unit 10 of the navigation system 1 is programmed to provide a route guidance by displaying a turn list table (branching points and information) on the display device 60. The turn list table shows intersections and rotaries in the guided route in the order of vehicle travel.

Figure 5A:
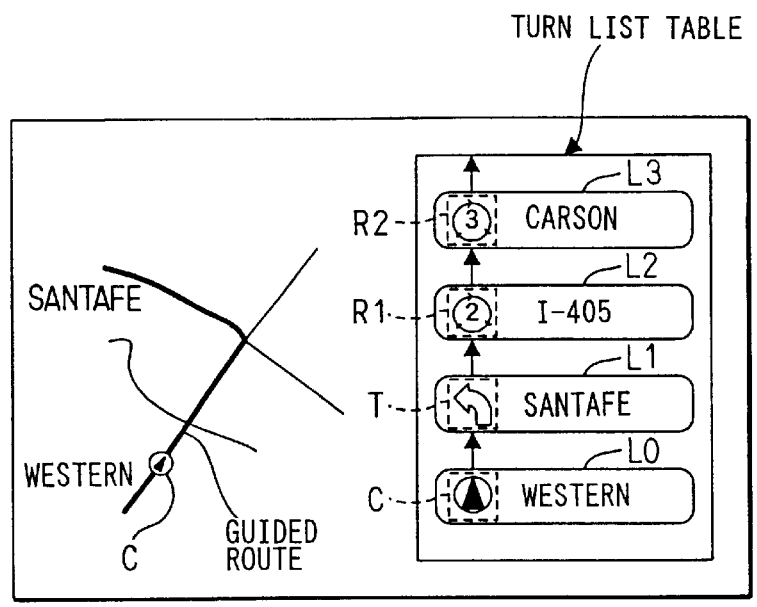
FIGS. 5A and 5B are schematic views showing navigation displays according to a second embodiment of the present invention.

As shown in FIG. 5A, the display 60 provides a map (left half) and a turn list table (right half) thereon when a guided route is determined. The map shows the guided route in a bold line, a vehicle present position C and additional data such as road names. The turn list table shows intersections and rotaries to be guided in the order of vehicle travel. The turn list table has a number of lists Lo through L3. The list Lo at the bottom indicates the present position. The list Lo includes a present position mark C and a present travel road name "WESTERN." The list L1 above the list Lo includes a turn mark T indicating a left turn at the next guided intersection, and a road name "SANTAFE" which should be taken after turning at the guided intersection. The list L2 above the list L1 includes a rotary mark R1 indicating a first rotary road, and a road name "I-405" which should be taken following the first rotary road. The list at the top (above L2) includes a second rotary mark R2, and a road name "CARSON" which should be taken following the second rotary road.

The lists are displayed in the order of vehicle travel. This display guides a driver to make a left turn first at the guided intersection, branches out at the first rotary and branches out further at the second rotary. Thus, the driver can recognize required branching in advance. After passing through the guided intersection shown in the bottom list L1, the lists L2 and L3 are moved to the positions of lists L1 and L2, respectively. A new list (not shown in FIG. 5A) including next branching point information is displayed where the list L3 was displayed. Thus, the turn list table is updated to continuously display information of coming three branching points in order.

Figure 6:
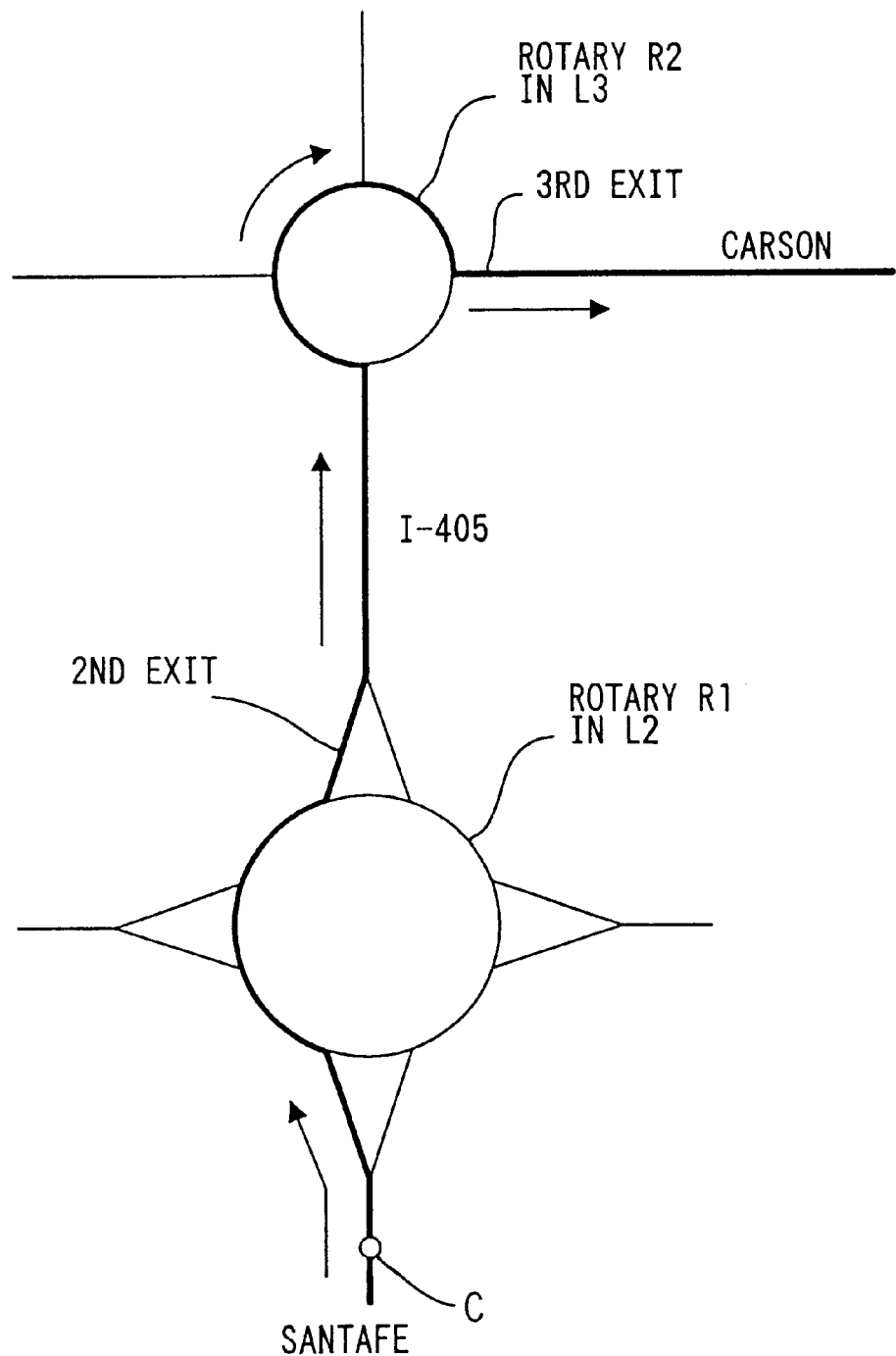
FIG. 6 is a schematic view showing an operation of the second embodiment.

In this embodiment, the rotary mark R1 and R2 in the list L2 and L3 in FIG. 5A has respective numbers (N) therein to indicate the N-th exits in the first rotary R1 and the second rotary R2. In the case of N=2 and N=3 in the rotary marks R1 and R2 of the lists L2 and L3 shown in FIG. 5A, the numbers "2" and "3" indicate the second exit and the third exit which should be taken after entering the first rotary R1 and the second rotary R2, respectively. The above turn list table is displayed in the case that the route guidance is determined as shown with a bold line in FIG. 6. FIG. 6 shows the guided route which includes two successive rotaries R1 and R2 connected by the road I-405.

The above turn list table informs that the driver should take the second exit in the first rotary R1, then the road I-405 and the third exit in the second rotary R2 to CARSON road after making the left turn to SANTAFE road as shown in the map displayed as shown in FIG. 6, if the driver follows the route guidance for the destination. Thus, the driver can recognize which exit should be taken in each rotary and readily match the displayed exit number information for the branch road with the coming rotary to travel to the destination.

Figure 5B:
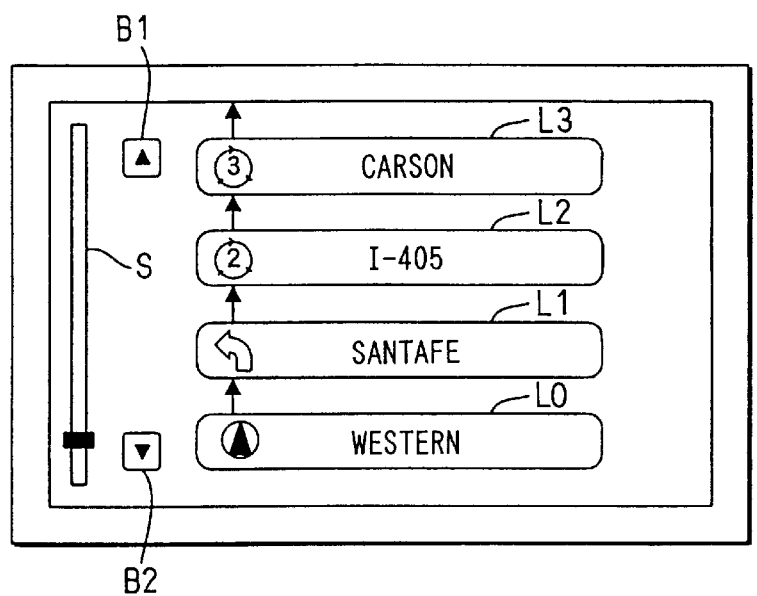

The display of FIG. 5A may be modified to display only the turn list table as shown in FIG. 5B. In this modified display, a scroll bar S and scroll buttons B1, B2 are added by hand manipulation so that display is scrolled to display lists of information of branching points other than the displayed lists L1 through L3. Thus, the driver can refer to information of all branching points of interest included in the route guidance.

In the second embodiment, the road number (exit number) may be displayed as a part of a list of the table in place of indicating as the N-th exit so that the driver need not count the number of exits in each rotary. The information of the exit provided as a part of the rotary mark R1 and R2 may be provided in different formats, as long as such information is provided in correspondence with the lists L2 and L3 indicative of the rotaries.

The present invention is not limited to the above disclosed embodiments and modifications, but may be implemented in many other ways without departing from the spirit of the invention.

What is claimed is:

1. A navigation system comprising:
    guidance means for providing a travel route guidance to a destination and a branching guidance when the travel route guidance includes branching of a road from a guided route or through a rotary, the branching guidance being provided upon approaching to a branch road; and
    storage means storing a branch road number specific to the branch road and identical with a road number actually displayed on a roadside in correspondence with the branch road,
    wherein the guidance means is constructed to retrieve the branch road number from the storage means and indicates the branch road number as the branching guidance.

2. The navigation system as in claim 1, wherein the guidance means is constructed to provide a voice message of the branch road number.

3. The navigation system as in claim 1, wherein the guidance means is constructed to provide a display of the branch road number.

4. A navigation system comprising:
    display means; and
    guidance means for displaying on the display means a travel route guidance to a destination and a branching information including information of a rotary road included in the travel route guidance, the branching information being provided in the order of travel,
    wherein the guidance means is constructed to display as the rotary road information a N-th of branch road among branch roads branching out from the rotary road after entering the rotary roads.

5. A navigation system comprising:
    display means;
    guidance means for displaying a travel route guidance to a destination and a branching information including information of a rotary road included in the travel route guidance, the branching information being provided in the order of travel; and
    storage means storing a branch road number specific to a branch road branching out from the rotary road and identical with a road number actually displayed on a roadside in correspondence with the branch road,
    wherein the guidance means is constructed to retrieve the branch road number from the storage means and displays the branch road number as information of the rotary road.

6. A navigation method for providing a travel route guidance to a destination and a branching guidance for indicating a branch road to be taken from a presently traveling road in the course of the travel route guidance, the method comprising the steps of:
    checking whether an exit number which is specific to the branch road to be taken is available in a road map data stored in a memory, the exit number being identical with a number actually indicated on a roadside;
    retrieving the exit number from the memory if available in the memory; and
    indicating the retrieved exit number in a vehicle.

7. The navigation method as in claim 6, wherein the indicating step includes a step of providing a voice message indicating the retrieved exit number.

8. A computer-readable program which stores the road map data and the steps of claim 6.

9. A navigation system as in claim 1, wherein the storage means further stores a branch road name specific to the branch road,
    wherein the guidance means is further constructed to retrieve the branch road name from the storage means and indicate the branch road name as further branching guidance.

10. A navigation system as in claim 9, wherein the guidance means is constructed to provide a voice message of the branch road name.

11. A navigation system as in claim 9, wherein the guidance means is constructed to provide a display of the branch road name.

12. A navigation system as in claim 4, wherein the guidance means is further constructed to further provide a voice message as the rotary road information regarding the N-th branch road among branch roads branching out from the rotary road after entering the rotary road and upon approaching the N-th branch road.

13. A navigation system as in claim 4, wherein the guidance means is further constructed to further display as the rotary road information a branch road name corresponding to the N-th of branch road among branch roads branching out from the rotary road after entering the rotary road.

14. A navigation system as in claim 5, wherein the storage means further stores a branch road name specific to a branch road branching out from the rotary road corresponding with the branch road, wherein the guidance means is further constructed to retrieve the branch road name from the storage means and display the branch road name as information of the rotary road.

15. A navigation method as in claim 6; further including checking, when the exit number is not available, whether a name that is specific to the branch road to be taken is available in data stored in memory, retrieving the name, if available in the memory, and indicating the name in the vehicle.

16. A navigation method as in claim 15, wherein the indicating the name includes providing a voice message indicating the name.

17. A navigation method as in claim 15, further including, when the name is not available, indicating an exit to be taken in relative terms.

18. A navigation method as in claim 17 further including providing a voice message indicating the exit to be taken in relative terms upon approaching the exit to be taken.

* * * * *